US012781992B2

(12) United States Patent
Nagime et al.

(10) Patent No.: US 12,781,992 B2
(45) Date of Patent: Nov. 3, 2026

(54) SYSTEM AND METHOD FOR ACOUSTICAL ABSORPTION IN A HEATING, VENTILATION, AND/OR AIR CONDITIONING SYSTEM

(71) Applicant: Johnson Controls Tyco IP Holdings LLP, Milwaukee, WI (US)

(72) Inventors: Shivchandra Venkatrao Nagime, Latur (IN); Paul F. Bauch, York, PA (US); Amol Khedekar, Pune (IN); Brian Michael Meyers, Jr., York, PA (US); Austin Lehman, York, PA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 220 days.

(21) Appl. No.: 18/472,741

(22) Filed: Sep. 22, 2023

(65) Prior Publication Data

US 2024/0102690 A1 Mar. 28, 2024

Related U.S. Application Data

(60) Provisional application No. 63/409,334, filed on Sep. 23, 2022.

(51) Int. Cl.
*F24F 13/02* (2006.01)
*G10K 11/16* (2006.01)

(52) U.S. Cl.
CPC ........ *F24F 13/0263* (2013.01); *G10K 11/161* (2013.01)

(58) Field of Classification Search
CPC ........................... F24F 13/0263; G10K 11/161
USPC ........................................................... 181/224
See application file for complete search history.

(56) References Cited

U.S. PATENT DOCUMENTS 2,916,101 A * 12/1959 Naman ................ G10K 11/172 181/224
3,195,679 A * 7/1965 Duda .................. F01N 13/1855 181/222
3,507,356 A * 4/1970 Smith ...................... F24F 13/24 454/262
4,266,602 A * 5/1981 White ...................... H01F 27/33 165/DIG. 313

(Continued)

FOREIGN PATENT DOCUMENTS

DE 20011965 U1 * 9/2000 .............. F24F 13/24

OTHER PUBLICATIONS

English translation of DE 20011965 U1, accessed Feb. 11, 2026 via Espacenet (Year: 2000).*

*Primary Examiner* — Jeremy A Luks
(74) *Attorney, Agent, or Firm* — Fletcher Yoder, P.C.

(57) ABSTRACT

An acoustically absorptive system for a heating, ventilation, and/or air conditioning (HVAC) system includes a panel assembly. The panel assembly includes at least one acoustic absorptive member and a porous housing disposed about the at least one acoustic absorptive member such that a porous layer of the housing covers the at least one acoustic absorptive member at opposing faces of the panel assembly. A mounting assembly positions the panel assembly in a chamber of the HVAC system such that a gap is defined between a rear surface of the panel assembly and a wall of the chamber, the mounting assembly including one or more channels attached to the chamber.

18 Claims, 5 Drawing Sheets

(56) References Cited

U.S. PATENT DOCUMENTS

| | | | | | |
|---|---|---|---|---|---|
| 4,276,954 | A * | 7/1981 | Romano | F24F 13/24 181/291 |
| 4,316,522 | A * | 2/1982 | Hirschorn | F02M 35/1216 181/252 |
| 5,332,872 | A * | 7/1994 | Ewanek | F04D 29/663 181/258 |
| 5,679,931 | A * | 10/1997 | Furse | E04F 17/04 181/275 |
| 5,817,990 | A * | 10/1998 | Furse | F24F 13/24 52/145 |
| 6,260,658 | B1 * | 7/2001 | Darrell | F02C 7/045 181/224 |
| 6,537,490 | B2 * | 3/2003 | Han | F02C 7/045 181/224 |
| 7,258,196 | B2 * | 8/2007 | Radatus | F24F 13/24 181/271 |
| 7,581,619 | B1 * | 9/2009 | Storm | F24F 13/20 454/262 |
| 8,579,074 | B2 * | 11/2013 | Kosaka | F02C 7/045 181/224 |
| 8,863,894 | B2 * | 10/2014 | Kato | F01D 25/30 60/725 |
| 9,121,174 | B1 * | 9/2015 | Chen | F24F 13/24 |
| 9,546,582 | B1 * | 1/2017 | Zhang | F01N 1/24 |
| 10,260,772 | B2 * | 4/2019 | Mouratidis | G10K 11/161 |
| 10,508,828 | B2 * | 12/2019 | Jeong | F24F 13/0263 |
| 10,775,074 | B2 * | 9/2020 | Rainey | F24F 3/0442 |
| 2002/0050418 | A1 * | 5/2002 | Jenvey | F24F 13/0281 181/224 |

* cited by examiner

SYSTEM AND METHOD FOR ACOUSTICAL ABSORPTION IN A HEATING, VENTILATION, AND/OR AIR CONDITIONING SYSTEM

CROSS-REFERENCE TO RELATED APPLICATION

This application claims priority to and benefit of U.S. Provisional Patent Application No. 63/409,334, entitled "AN ACOUSTICALLY ABSORPTIVE UNIT," filed Sep. 23, 2022, which is hereby incorporated by reference in its entirety for all purposes.

BACKGROUND

This section is intended to introduce the reader to various aspects of art that may be related to the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Sound absorbing panels are used as a noise reduction device in heating, ventilation, and/or air conditioning (HVAC) systems. For example, sound absorbing panels may be installed in an air handling unit (AHU) of a HVAC system. A conventional sound absorbing panel may be attached to a wall of an AHU with fasteners or integrated into a wall of the AHU. It is now recognized that traditional sound absorbing panels create inefficiencies in installation and operation. Accordingly, it is now recognized that there is a need for improved sound absorption systems.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an acoustically absorptive system for a heating, ventilation, and/or air conditioning (HVAC) system includes a panel assembly. The panel assembly includes at least one acoustic absorptive member and a porous housing disposed about the at least one acoustic absorptive member such that a porous layer of the housing covers the at least one acoustic absorptive member at opposing faces of the panel assembly. A mounting assembly positions the panel assembly in a chamber of the HVAC system such that a gap is defined between a rear surface of the panel assembly and a wall of the chamber, the mounting assembly including one or more channels attached to the chamber.

In an embodiment, an air handling unit (AHU) includes an acoustically absorptive system. The acoustically absorptive system includes at least one acoustic absorptive member and a porous housing disposed about the at least one acoustic absorptive member such that a porous layer of the housing covers the at least one acoustic absorptive member at opposing faces of a panel assembly defined by the at least one acoustic absorptive material and the porous housing. A mounting assembly couples to an interior of the AHU and positions the panel assembly in the AHU such that a gap is defined between a face of the porous housing and an internal surface of the AHU.

In an embodiment, a heating, ventilation, and/or air conditioning (HVAC) system includes an air handling unit defining a chamber therein. A mounting assembly is disposed in the chamber. A panel assembly includes an acoustic absorptive member disposed within a porous housing such that the porous housing covers the acoustic absorptive member at opposing faces of the panel assembly and on each opposing edge of the panel assembly. The mounting assembly is operable to slidably receive the panel assembly and offset the panel assembly from an internal surface of the chamber facing a rear surface of the panel assembly to define a gap between the rear surface of the panel assembly and the internal surface of the chamber.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
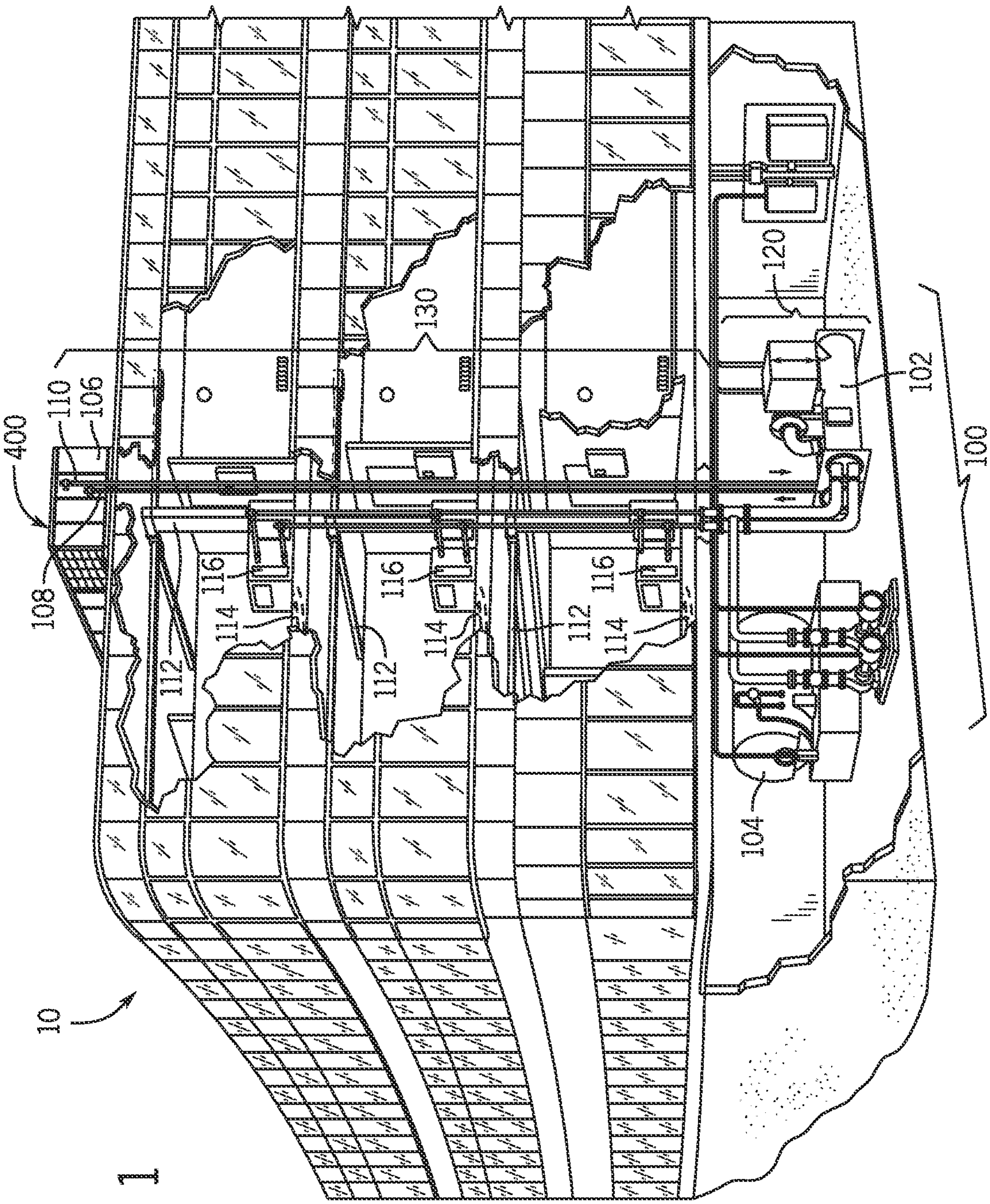
FIG. 1 is a perspective view of a building including a heating, ventilating, or air conditioning (HVAC) system employing an acoustic absorption system in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure details an acoustically absorptive system for a heating, ventilation, and/or air conditioning (HVAC) system. The acoustically absorptive system comprises an acoustic absorptive panel having at least one acoustic absorptive member and one or more porous members (e.g., perforated sheet metal) substantially covering the acoustic absorptive member. Indeed, in accordance with present embodiments, the porous member(s) cover a front surface, a rear surface, and side surfaces of the acoustic absorptive member. Specifically, for example, substantially all sides of an acoustic absorptive member (e.g., a foam block) are covered or wrapped in a porous sheet such that sound waves can freely engage with the sound absorbing material of the acoustic absorptive member and such that structural support is also provided to the sound absorbing material (e.g., foam, shredded material, fibers), which tends to be lacking in rigidity.

The acoustic absorptive panel may be formed in the shape of a rectangular prism. While not limited to a strict mathematical definition of a rectangular prism, the acoustic absorptive panel may have two main sections or faces and four side sections that are essentially perpendicular and that extend between the two faces. The porous member(s) cover at least the two main sections or faces. Further, the porous members may form a porous housing and may include supporting structural material with holes/openings formed therein or already present due to the nature of the material. For example, a porous member may include a sheet of rigid plastic that has been perforated or a sheet of expanded metal that has been stretched to reveal openings therethrough, among other similar options.

The acoustically absorptive system comprises a mounting assembly for positioning the acoustic absorptive panel in an HVAC device to provide free space between a rear surface of the acoustic absorptive panel and an interior surface of a wall of the HVAC device. The mounting assembly includes one or more channels (e.g., rails) attached to the HVAC device (e.g., an interior base and/or interior ceiling of a chamber within the HVAC device) and operable to slidingly receive edges (including side sections) of the acoustic absorptive panel. The one or more channels are positioned such that a small fraction of an interior width of the chamber forms the free space between the rear surface of the acoustic absorptive panel and the interior surface of the wall. This free space may be referred to as the gap. The rear surface of the acoustic absorptive panel may be defined as the face (main section) of the acoustic absorptive panel that is closest to an interior wall of the chamber in which the acoustic absorptive panel is disposed. Thus, the gap may be defined as the space between the rear surface of the acoustic absorptive panel and an interior surface of the HVAC device chamber in which the acoustic absorptive panel is deployed.

Present embodiments are directed to an acoustic panel and noise reduction system of heating, ventilation, and/or air conditioning (HVAC) system, such as an air handling unit (AHU). In conventional systems, a sound absorbing panel may include an acoustic absorptive member (e.g., a foam slab) and a basket (e.g., a mesh basket) for covering the absorptive member. The basket is open on one side and includes flanges extending therefrom so that the basket can be coupled to an interior wall (interior facing surface of a wall) of the HVAC system via fasteners extending through the brackets and the interior wall with the open side facing the interior wall. Thus, the basket coordinates with the wall to trap the absorptive member against the interior wall such that the interior wall and the absorptive material are in direct contact on one side and a basket surface is on the other side. Indeed, conventional sound absorbing panels are either attached to a wall of an AHU in such a manner or integrated into wall panels of the AHU.

It is now recognized that such conventional sound absorbing panels have certain drawbacks that presently disclosed embodiments address or improve upon. For example, as one side of the sound absorbing panel in a conventional system is abutted against a wall, it is now recognized that effective area available for acoustic absorption is reduced by this arrangement, resulting in acoustic performance that is inefficient compared to present embodiments wherein an acoustic absorptive member is not held adjacent the wall but separated by the above-referenced gap. Also, these conventional sound absorbing panels demonstrate low acoustic performance (e.g., particularly for lower frequency noise) relative to present embodiments. Indeed, present embodiments are believed to perform more efficiently, in part, due to the gap defined between the acoustic absorptive member and the interior wall, as described above. Further, in contrast to the arrangement of conventional sound absorbing panels which can block access to interior surfaces, the gap between the acoustic absorbing member and the wall in present embodiments allows for mounting of electrical cables in the air handling unit (in the gap itself) after the panel is attached to the wall. Further still, present embodiments facilitate installation by enabling sliding engagement of the sound absorbing panels with relevant chambers of an HVAC system (e.g., via rails). Additionally, it should be noted that the flanges and fasteners of conventional systems are cumbersome and inefficient, consuming useful space that is used by present embodiments to further dampen sound.

Referring now to FIG. 1, a perspective view of a building 10 is shown. Building 10 is served by a heating, ventilating, or air conditioning (HVAC) system 100. HVAC system 100 can include a plurality of HVAC devices (e.g., heaters, chillers, air handling units, pumps, fans, thermal energy storage, etc.) configured to provide heating, cooling, air conditioning, ventilation, and/or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.) that serves one or more buildings including building 10. The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outdoor air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

The AHU 106 is an example of an HVAC system component that can generate substantial noise levels, as can other aspects of the HVAC system 100. Accordingly, the AHU 106 is depicted as incorporating an acoustic absorptive panel system 400 in accordance with present embodiments. For ease of reference, the acoustic absorptive panel system 400 may be referred to herein as an acoustic absorptive panel unit 400 or simply the unit 400. Relative to traditional sound absorbing panels, the unit 400 has an improved effective absorption area resulting in better acoustic absorbing performance, allows for more efficient installation and removal, provides a more robust structure, and includes an offset from an interior wall that is believed to improve noise reduction and facilitates maintenance/assembly (e.g., installation of and access to wiring in the AHU 106).

The unit 400 is arranged such that an acoustic absorptive material (e.g., a foam sheet or layer) is spaced apart from a wall of the HVAC system 100, specifically an interior surface of a wall of the AHU 106. The unit 400 includes what may be referred to as a panel assembly or an acoustic absorptive panel, which includes at least one acoustic absorptive member (e.g., one or more layers of acoustic absorptive material) covered with one or more porous members (e.g., perforated metal sheeting). The acoustic absorptive panel may be mounted within the AHU 106 by direct coupling with a base, a roof, and/or walls of the AHU 106, which is representative of any number of chambers that may be included in the HVAC system 100. The unit 400 may include a mounting assembly for positioning the panel assembly in the AHU 106 such that a free space or gap is provided between the panel assembly and a wall of the AHU 106. In some embodiments, the acoustic absorptive panel is mounted in a way such that free space is provided between a rear surface of the acoustic absorptive panel and the wall, wherein rear surface is defined above. The mounting assembly may include one or more channels attached to at least one of a base, a roof, and/or a side of the AHU 106 for receiving the acoustic absorptive panel. For example, the mounting assembly may include channels (e.g., rails with side flanges) for slidably receiving the acoustic absorptive panel, which once in place may be secured via fasteners, latches, or the like.

Figure 2:
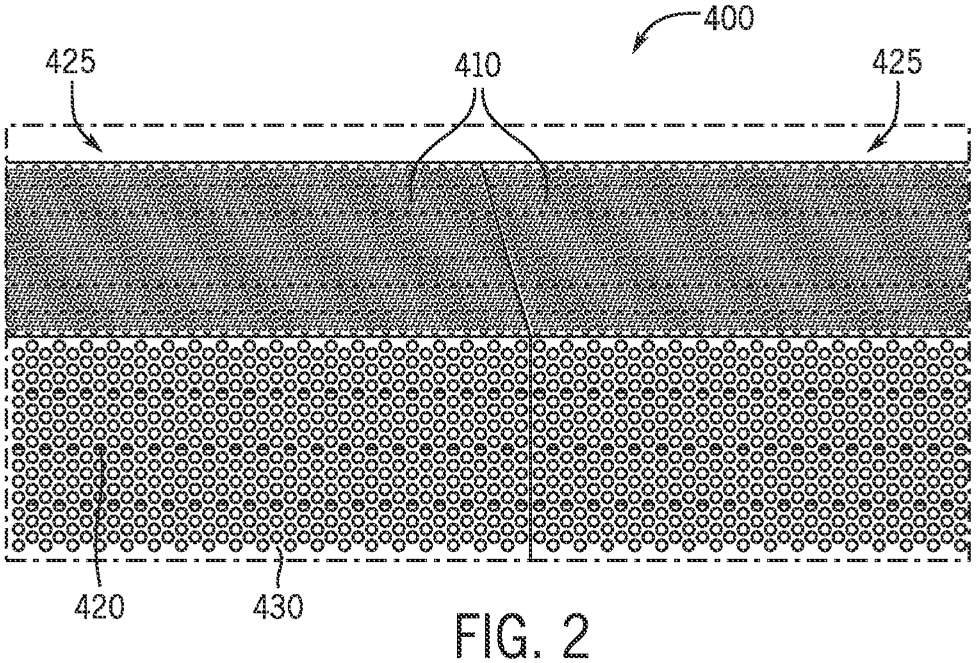
FIG. 2 is a perspective view of a pair of acoustic absorptive panels for an acoustically absorptive HVAC unit in accordance with an embodiment of the present disclosure.

FIG. 2 is a perspective view of a pair of acoustic absorptive panels 410 for an acoustically absorptive HVAC unit in accordance with an embodiment of the present disclosure. The unit 400 may include the acoustic absorptive panels 410, which may be referred to as panels 410, assembled together and adjacent one another. The panels 410 each include at least one acoustic absorptive member 420, which may be referred to as the absorptive member 420 (e.g., a foam block or sheet) disposed within a porous housing 425. In the illustrated embodiment, the absorptive member 420 includes multiple layers, which are visible through openings of the porous housing 425.

The absorptive member 420 is provided to absorb or dampen sound waves. The absorptive member 420 can be of any suitable material including fiberglass, foam, cotton, or rockwool. In some embodiments, the absorptive member 420 can have a composite structure with more than one material (e.g., layers formed from different materials). The absorptive member 420 can have layers or elements of different materials. In some embodiments, the absorptive member 420 is fiberglass. However, any material with sound dampening properties may be employed to form the absorptive member 420 as long as it can be retained within the porous housing 425, which may be formed from a single or various porous members 430. For example, the porous members 430 may be metal sheeting with perforations, expanded metal, 3D printed layers, plastic with opening or holes, and so forth.

The unit 400 includes one or more porous members 430 provided for substantially covering the absorptive member 420. The porous member(s) 430 typically cover a front surface, a rear surface, and side surfaces of the absorptive member 420. As previously discussed, the panels 410 may each generally form a rectangular prism. The front and rear surfaces may be considered the faces of such a prism. That is, the front and rear surfaces may be opposing faces, which are the largest two surfaces of a respective prism defined by a particular one of the panels 410. The porous member(s) 430 may or may not cover a top surface and a bottom surface of the absorptive member 420. These top and bottom surfaces may be considered the top and bottom side sections that engage with the mounting assembly. In some embodiments, the porous member(s) 430 may include perforated sheets. Further, the porous member(s) 430 may include a polymer film to control material erosion. The polymer film may be provided in conjunction with the perforated sheets. The term porous is used herein to indicate that openings are disposed in the porous members 430. Such openings may be formed in any manner or they may be inherent and pre-existing in the material chosen to form the porous member(s) 430.

Figure 3:
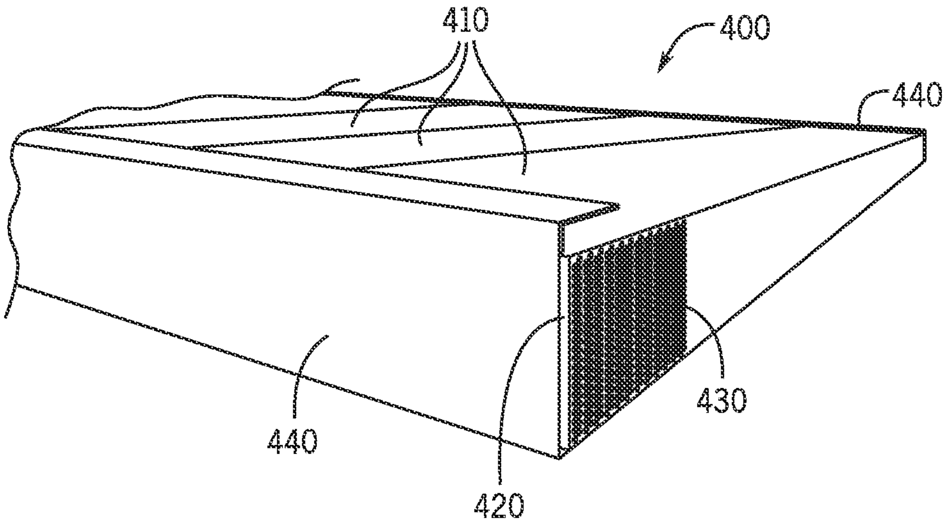
FIG. 3 is a perspective view of the acoustic absorptive panels installed in a channel of the acoustically absorptive HVAC unit in accordance with an embodiment of the present disclosure.

FIG. 3 is a perspective view of the acoustic absorptive panels 410 installed in rails 440 of the acoustically absorptive HVAC unit 400 in accordance with an embodiment of the present disclosure. In the illustrated embodiment, the rails 440 or channels 440 are disposed about opposing sides of the assembled acoustic absorptive panels 410. Further, in the illustrated embodiment, the rails 440 are separate from any chamber of the HVAC system 100. However, in accordance with present embodiments, the rails 440 would be installed in a chamber (e.g., the AHU 106) such that the panels 410 could be slid into engagement therewith. For example, the rails 440 may be secured to a ceiling and floor, respectively, of the AHU 106 so that upper and lower sides of the panels 410 could slide into the rails. In some embodiments, because the edges (side sections) of the panels 410 face each other and/or face the internal-facing side of the rails 440, non-porous material may be used to cover the edges or the edges may be left exposed. However, using a single material is efficient and structurally sound. Further, employing porous material consistently can limit weight relative to using other materials, which can be beneficial.

It should be noted that present embodiments do not employ a basket-style housing with flanges. Rather, in the illustrated embodiment, the absorptive member 420 is covered on both faces, a first face 432 and a second face 434, so that both faces 432, 434 function to absorb sound. Further, the lack of flanges, which are typically required for securement of a conventional sound reducing panel to an AHU 106, allows for direct abutment of the acoustic absorptive panels 410 with each other, which increases the active surface area for sound absorption in present embodiments. Once the panels 410 are disposed within the rails 440, the rails 440 and the panels 410 may be fastened together by clamping the rails 440 about the panels 440, passing fasteners through the rails 440 and the porous housing 425 and/or the absorptive member 420, activating a latch to block the panels 410 from sliding out of engagement with the rails 440, or the like.

Figure 4:
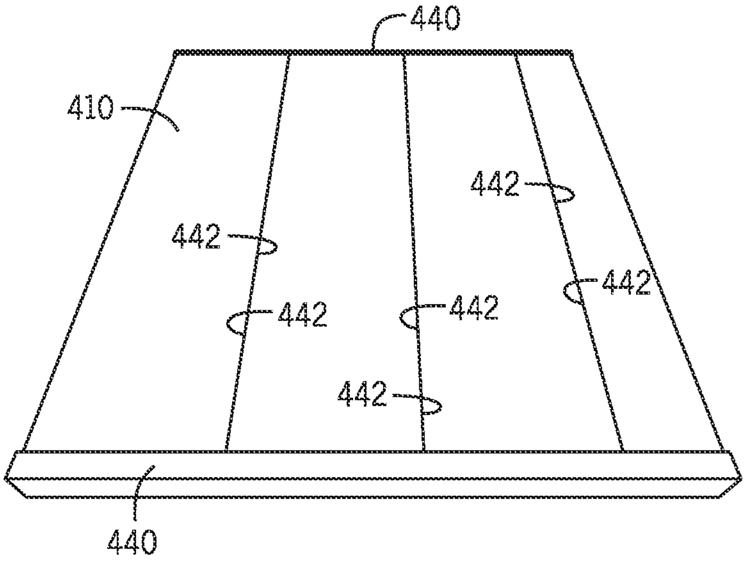
FIG. 4 is a perspective view of the acoustic absorptive panels assembled together between channels of the acoustically absorptive HVAC unit such that adjacent sides of the respective acoustic absorptive panels are abutting in accordance with an embodiment of the present disclosure.

FIG. 4 is a perspective view of the acoustic absorptive panels 410 assembled together between the rails 440 of the acoustically absorptive HVAC unit 400 such that adjacent sides 442 of the respective acoustic absorptive panels 410 are abutting each other in accordance with an embodiment of the present disclosure. The view provided by FIG. 4 illustrates the benefit of avoiding flanges utilized in conventional systems. Indeed, the illustrated sides 442 are immediately abutting, whereas conventional systems would require spacing for the flanges to extend between the conventional sound absorbing panels. Because present embodiments do not include such flanges, interior surfaces of the HVAC system 100 in which the unit 400 is employed may avoid exposure to direct sound and more surface area of the acoustic absorptive panels 410 can be actively employed for sound reduction/absorption.

Figure 5:
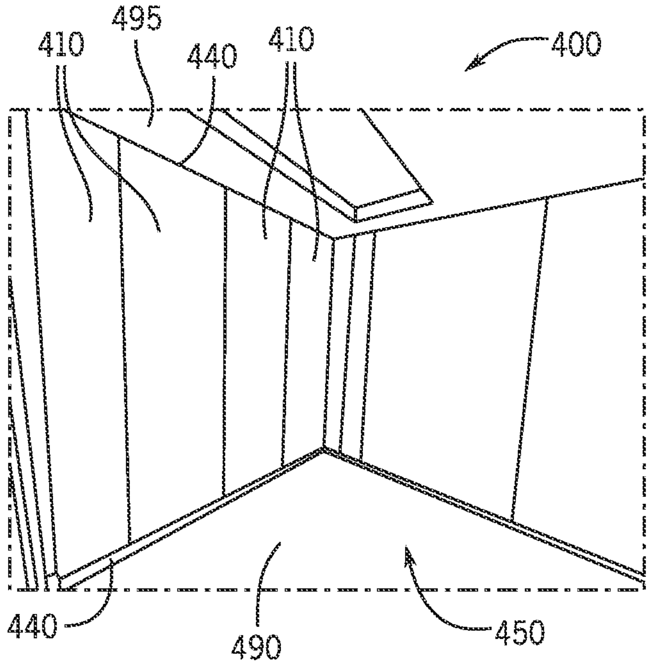
FIG. 5 is a perspective view of the acoustically absorptive panels assembled within a chamber of an HVAC unit, such as within an air handling unit (AHU) in accordance with an embodiment of the present disclosure.
Figure 6:
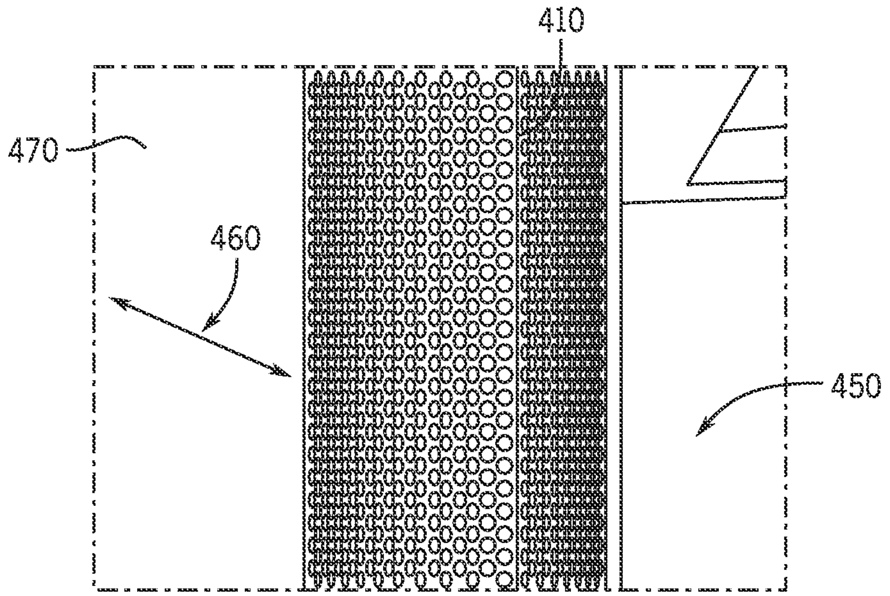
FIG. 6 is a perspective view of a portion of the absorptive panels assembled within the chamber of the HVAC unit, wherein a gap of a fixed or variable length is formed between the acoustically absorptive panels and a boundary of the chamber (e.g., a wall of the AHU) in accordance with an embodiment of the present disclosure.

FIG. 5 is a perspective view of the acoustically absorptive panels 410 assembled within a chamber 450 of an HVAC unit, such as within the AHU 106 in accordance with an embodiment of the present disclosure. FIG. 6 is a magnified perspective view of a portion of the absorptive panels 410 assembled within the chamber 450 of the HVAC unit, wherein a gap 460 having a fixed or variable length is formed between the acoustically absorptive panels 410 and a boundary 470 of the chamber 450 (e.g., a wall of the AHU 106) in accordance with an embodiment of the present disclosure. The gap 460 may be variable in that the panels 410 may be moved via an actuator or by simply transitioning the panels 410 within the rails 440 to take advantage of extra space on either side (within bound of the rail) before securing the panels 410 in place (e.g., coupling the panels 410 with the rails 440). This may be beneficial because it potentially allows for tuning of sound attenuation. FIGS. 5 and 6 together illustrate the panels 410 mounted within the chamber 450 of an HVAC component and also the gap 460, which is formed thereby. In some embodiments, the chamber 450 is of an air handling unit. However, the chamber 450 is not limited to being an air handling unit, and the panels 410 can be arranged within any suitable HVAC device for acoustic wave absorption purposes.

The unit 400 may include a mounting assembly (e.g., the rails 440), wherein the mounting assembly is arranged to position the panels 410 in the chamber 450 to provide a flexible or fixed free space or gap 460 between a the panels 410 (e.g., a rear surface of the panels 410) and the boundary 470 (e.g., an interior surface of a wall of the HVAC system). The free space or gap 460 results in an increase in total effective area of the panels 410 as rear surfaces of the panels 410 can also absorb acoustic waves, thereby improving acoustic dampening performance of the panel 410. The mounting assembly may include one or more channels (e.g., the rails 440) attached to at least one of a base 490 and a roof 495 of the chamber 450 for receiving the panels 410. It should be noted that, while the panels 410 are often referred to herein in the plural, present embodiments include utilization of a single panel 410 as well.

Figure 7:
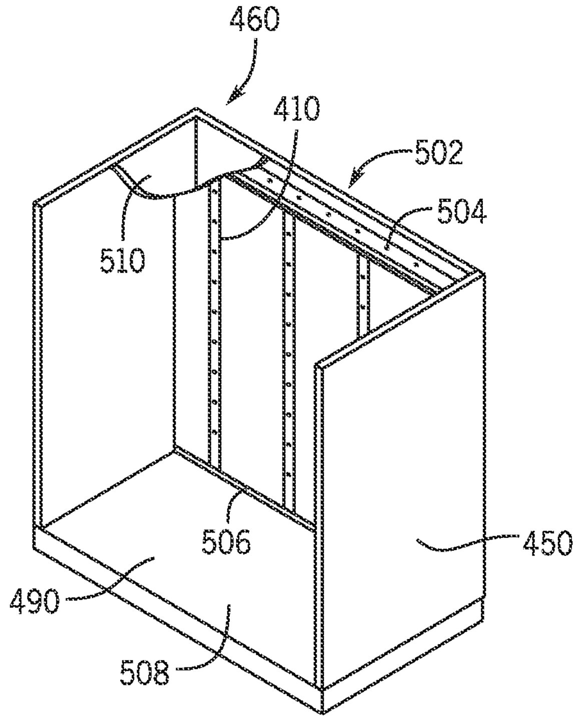
FIG. 7 is an overhead perspective view of a chamber of an HVAC unit with acoustically absorptive panels installed along a rear wall such that a gap is formed between the chamber wall and the acoustically absorptive panels.

FIG. 7 is an overhead perspective view of the chamber 450 of an HVAC unit with acoustically absorptive panels 410 installed along a rear wall 502 such that the gap 460 is formed between the rear wall 502 (an interior surface of the rear wall 502) of the chamber 450 and the acoustically absorptive panels 410. The gap 460 has a length that is a small fraction of the corresponding internal dimension of the chamber 450. That is, a length of the chamber 450 extending in the same direction as the length of the gap 460 is much greater than the length of the gap 460. An interior of the chamber 450 is visible in FIG. 7. Further, FIG. 7 illustrates an upper rail 504 and a lower rail 506 of the rails 440. The lower rail 506 is coupled to a base 508 of the chamber 450 and the upper rail 504 is coupled to a ceiling 510 of the chamber 450, which is shown as cut away. The ceiling 510 is shown as cut away in FIG. 7 to facilitate viewing of the other system features, which are inside the chamber 450.

Figure 8:
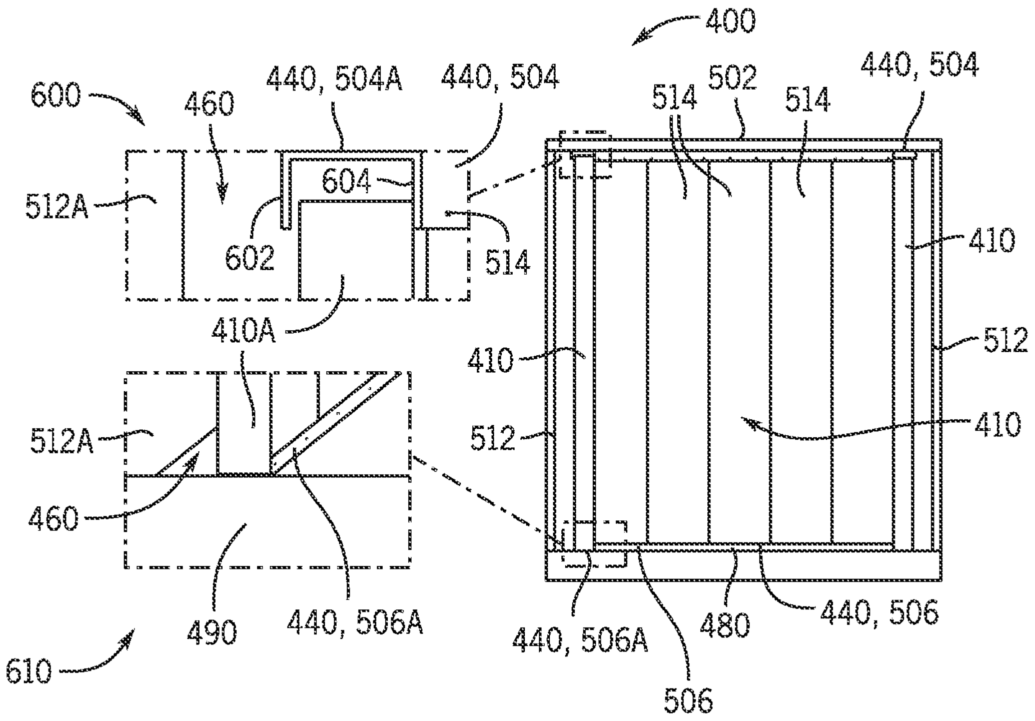
FIG. 8 is an elevation view of an interior of a chamber of an HVAC unit with multiple acoustically absorptive panels installed along a rear wall and side interior walls of a chamber along with a magnified view of the gap formed between a side wall of the chamber and an installed acoustically absorptive panel in the upper left, and a magnified perspective view of the same gap formed between the side wall and the installed acoustically absorptive panel in the lower left in accordance with an embodiment of the present disclosure.

FIG. 8 includes an elevation view of an interior of the chamber 450 with multiple acoustically absorptive panels 410 installed along the rear wall 502 and side interior walls 512 of the chamber 540. Multiple upper rails 504 and multiple lower rails 506 are illustrated. Some of the rails 504, 506 are illustrated as extending into the page because they are positioned to receive the panels 410 that extent parallel to the side walls 512. The rails 440 include receptacles 514 for fasteners that may extend through the rails 440 to engage the panels 410 and secure them in place. FIG. 8 also includes a magnified view 600 of features forming the gap 460 between a side wall 512A of the chamber 540 and an installed acoustically absorptive panel 410A in an upper left of the illustrated chamber 450. While the acoustically absorptive panel 410A has room for movement within an associated rail 504A, a minimum gap size is defined by the rail 504A because the rail 504A is arranged to retain the acoustically absorptive panel 410A between its two flanges 602, 604. Further, FIG. 8 includes a magnified perspective view 610 of the same gap 460 formed between the side wall 512A and the installed acoustically absorptive panel 410A in a lower left of the chamber 540. In this aspect of FIG. 8, the gap 460 is presented in a perspective view.

Also, it should be noted that the rail 506A is L-shaped instead of U-shaped like rail 504A. However, present embodiments may include any of various different rail shapes or combinations of shapes to achieve desired gap sizes and to retain the acoustically absorptive panels 410. Indeed, the rail 504A and the rail 506A are not limited to aforementioned shapes and can have any other suitable shape (e.g., a C-shape) in other embodiments of the present disclosure. The term rail is utilized herein to broadly include channels, guides, and extensions configured to engage with edges of the acoustically absorptive panels 410.

In some embodiments, the panel 410 is arranged within the chamber 450 such that the gap 460 is maintained between a rear surface of the panel 410 and a wall of the chamber 450 which is facing the rear surface of the panel 410. The panel 410 may extend from a base of the chamber 450 to a roof of the chamber 450. The panel 410 may be directly coupled to at least one of the base and roof of the chamber 450. The panel 410 may be coupled using fasteners (e.g., screws, nails, glue, adhesive, welding) or any other suitable attachment feature or mechanism.

The unit 400 has better acoustic performance than traditional systems because effective area of the panel is increased. Additionally, due to free space between the panel and the wall of HVAC device, electrical cables can be passed through the free space. Further, the unit 400 demonstrates better acoustic performance at lower frequency noise. Additionally, the unit can be easily installed using the mounting assembly.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure.

Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An acoustically absorptive system for a heating, ventilation, and/or air conditioning (HVAC) system, the acoustically absorptive system comprising:

a first panel assembly and a second panel assembly each including at least one acoustic absorptive member and a porous housing disposed about the at least one acoustic absorptive member such that a porous layer of the housing covers the at least one acoustic absorptive member at opposing faces of the respective panel assembly, wherein the first and second panel assemblies are configured to abut each other and extend in substantially perpendicular directions from each other; and a mounting assembly configured to position the first and second panel assemblies in a chamber of the HVAC system such that a gap is defined between rear surfaces of the first and second panel assemblies and interior walls of the chamber and the first and second panel assemblies extend substantially parallel to the interior walls of the chamber, the mounting assembly including a first channel coupled to a base of the chamber and a second channel coupled to a roof of the chamber, wherein the first channel is an L-shaped rail configured to slidably receive the first panel assembly and the second panel assembly, and the second channel is a U-shaped rail configured to slidably receive the first panel assembly and the second panel assembly.

2. The acoustically absorptive system of claim 1, wherein the porous housing comprises one or more porous members.

3. The acoustically absorptive system of claim 1, wherein the porous housing comprises perforated metal or plastic sheeting.

4. The acoustically absorptive system of claim 1, wherein the porous housing comprises a single porous sheet of material wrapping the at least one acoustic absorptive member to cover the opposing faces.

5. The acoustically absorptive system of claim 1, wherein the porous housing covers the at least one acoustic absorptive member at a front surface, a rear surface, and side surfaces of the respective panel assembly.

6. The acoustically absorptive system of claim 1, wherein the at least one acoustic absorptive member comprises fiberglass.

7. The acoustically absorptive system of claim 1, wherein the mounting assembly is adjustable to facilitate adjustment of a length of the gap.

8. The acoustically absorptive system of claim 1, wherein the gap comprises free space extending from the rear surfaces of the first and second panel assemblies to the interior walls of the chamber, and a length of the gap is a fraction of a corresponding internal dimension of the chamber.

9. An air handling unit (AHU) including an acoustically absorptive system, comprising:

a panel assembly comprising a first acoustic panel and a second acoustic panel configured to abut each other and extend in substantially perpendicular directions from each other, wherein the first acoustic panel and the second acoustic panel each comprise:

at least one acoustic absorptive member; and a porous housing disposed about the at least one acoustic absorptive member such that a porous layer of the housing covers the at least one acoustic absorptive member at opposing faces of the respective acoustic panel defined by the at least one acoustic absorptive material and the porous housing; and a mounting assembly coupled to an interior of the AHU and configured to position the panel assembly in the AHU such that the first acoustic panel extends substantially parallel to a first internal surface of the AHU, a first gap is defined between a first face of the first acoustic panel and the first internal surface, the second acoustic panel extends substantially parallel to a second internal surface of the AHU, and a second gap is defined between a second face of the second acoustic panel and the second internal surface of the AHU, the mounting assembly including a first channel extending from a base of the AHU and a second channel extending from a ceiling of the AHU, wherein the first channel is an L-shaped rail configured to slidably receive the panel assembly, and the second channel is a U-shaped rail configured to slidably receive the panel assembly.

10. The AHU including the acoustically absorptive system of claim 9, wherein the mounting assembly is configured to facilitate movement of the panel assembly therein such that a size of the first gap is adjustable.

11. The AHU including the acoustically absorptive system of claim 9, wherein the porous housing comprises one or more porous members.

12. The AHU including the acoustically absorptive system of claim 11, wherein the one or more porous members comprise perforated metal or expanded metal.

13. The AHU including the acoustically absorptive system of claim 9, wherein the porous housing comprises a polymer wrap disposed about the at least one acoustic absorptive member.

14. A heating, ventilation, and/or air conditioning (HVAC) system, comprising:

an air handling unit defining a chamber therein;

a mounting assembly disposed in the chamber, wherein the mounting assembly comprises a first channel coupled to a base of the chamber and a second channel coupled to a roof of the chamber, and wherein the first channel is an L-shaped rail and the second channel is a U-shaped rail; and a first panel assembly and a second panel assembly each comprising an acoustic absorptive member disposed within a porous housing such that the porous housing covers the acoustic absorptive member at opposing faces of the respective panel assembly and on each opposing edge of the respective panel assembly, wherein the first and second panel assemblies are configured to abut each other and extend in substantially perpendicular directions from each other, and the mounting assembly is configured to slidably receive the first and second panel assemblies within the L-shaped rail and the U-shaped rail, offset the first and second panel assemblies from internal surfaces of the chamber facing rear surfaces of the first and second panel assemblies to define a gap between the rear surfaces of the first and second panel assemblies and the internal surfaces of the chamber, and position the first and second panel assemblies to extend substantially parallel to the internal surfaces of the chamber.

15. The HVAC system of claim 14, wherein the first and second panel assemblies are configured to move within the L-shaped rail and the U-shaped rail of the mounting assembly to adjust a size of the gap.

16. The HVAC system of claim 14, wherein the gap is at least 2 inches in length.

17. The HVAC system of claim 14, wherein the gap comprises free space extending from the rear surfaces of the first and second panel assemblies to the internal surfaces of the chamber, and a length of the gap is a fraction of a corresponding internal dimension of the chamber.

18. The HVAC system of claim 17, comprising one or more electrical cables disposed within the free space.

* * * * *